(12) United States Patent
Jinbo et al.

(10) Patent No.: US 9,506,223 B2
(45) Date of Patent: Nov. 29, 2016

(54) DISPLAY DEVICE FOR CONSTRUCTION MACHINE

(75) Inventors: Shimon Jinbo, Hiratsuka (JP); Jun Morinaga, Yokohama (JP); Hiroaki Take, Hiratsuka (JP); Kouzou Suzuki, Hirakata (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 13/583,568

(22) PCT Filed: Mar. 15, 2011

(86) PCT No.: PCT/JP2011/056002
§ 371 (c)(1),
(2), (4) Date: Nov. 26, 2012

(87) PCT Pub. No.: WO2011/115089
PCT Pub. Date: Sep. 22, 2011

(65) Prior Publication Data
US 2013/0110348 A1    May 2, 2013

(30) Foreign Application Priority Data

Mar. 19, 2010 (JP) ................................. 2010-065076

(51) Int. Cl.
*G06F 7/00* (2006.01)
*G06F 7/70* (2006.01)
(Continued)

(52) U.S. Cl.
CPC .............. *E02F 9/26* (2013.01); *B60K 35/00* (2013.01); *E02F 9/2075* (2013.01); *E02F 9/267* (2013.01); *G01D 7/08* (2013.01); *B60K 2350/1072* (2013.01); *B60Y 2200/41* (2013.01)

(58) Field of Classification Search
CPC .............. H04N 1/32518; H04N 21/25808; H04N 21/25891; H04N 21/26216; H04N 21/2662; H04N 21/4312; G06F 15/8053; G06F 11/2038; G06F 11/2028; G06F 11/1407; G06F 17/30982; G06F 15/7867; G06F 11/2051; G06T 2207/10024; G06T 2207/20221; G06T 7/0042; G06T 7/408
USPC .......... 701/50, 35, 1, 36; 340/945, 442, 439; 715/866; 700/101, 100, 106, 107, 99; 707/706, 722, 723, 738, 758, 802
See application file for complete search history.

(56) References Cited

U.S. PATENT DOCUMENTS 4,072,924 A * 2/1978 Pomerantz ........... G07C 5/0816
340/461
4,203,094 A * 5/1980 Sowa .................... G07C 5/0825
340/317

(Continued)

FOREIGN PATENT DOCUMENTS

CN    1603528 A    4/2005
CN    101545275 A    9/2009
(Continued)

OTHER PUBLICATIONS

International Search Report mailed May 10, 2011 in International Application No. PCT/JP2011/056002, 2 pages.
(Continued)

*Primary Examiner* — Calvin Cheung
*Assistant Examiner* — Luis A Martinez Borrero
(74) *Attorney, Agent, or Firm* — Fish & Richardson P.C.

(57) ABSTRACT

A display device includes a display controller and displays a content based on display signals output from the display controller. The display controller includes: a gauge value converter that converts measurements of a plurality of devices displayed in a predetermined unit into gauge values with the same scale; and a maximum gauge value determiner that determines a maximum one of the gauge values converted by the gauge value converter, so as for the gauge value determined by the maximum gauge value determiner to be displayed.

13 Claims, 9 Drawing Sheets

(51) Int. Cl.
  *G06F 19/00* (2011.01)
  *G06G 7/00* (2006.01)
  *G06G 7/76* (2006.01)
  *E02F 9/26* (2006.01)
  *B60K 35/00* (2006.01)
  *G01D 7/08* (2006.01)
  *E02F 9/20* (2006.01)

(56) References Cited

U.S. PATENT DOCUMENTS

| | | | | |
|---|---|---|---|---|
| 4,995,479 A * | 2/1991 | Fujiwara | | B66B 3/008 187/396 |
| 5,327,117 A * | 7/1994 | Kohsaka | | G08G 1/0962 340/459 |
| 5,880,710 A * | 3/1999 | Jaberi | | B60K 35/00 340/461 |
| 5,949,330 A * | 9/1999 | Hoffman | | B60K 37/02 340/438 |
| 6,289,332 B2 * | 9/2001 | Menig | | B60K 37/02 180/167 |
| 6,336,067 B1 | 1/2002 | Watanabe et al. | | |
| 6,339,737 B1 | 1/2002 | Yoshimura et al. | | |
| 6,493,616 B1 * | 12/2002 | Rossow | | E02F 9/205 37/414 |
| 6,812,942 B2 * | 11/2004 | Ribak | | B60K 35/00 345/30 |
| 6,877,135 B1 * | 4/2005 | Kamiwada | | G06F 3/0482 707/999.003 |
| 7,212,942 B2 * | 5/2007 | Vollum | | G01L 3/24 702/127 |
| 8,490,005 B2 * | 7/2013 | Tarte | | B60K 35/00 362/489 |
| 8,510,026 B2 * | 8/2013 | Desanzo | | H04L 67/125 246/167 R |
| 8,548,677 B2 * | 10/2013 | Sugiyama | | G06F 5/00 340/425.5 |
| 8,577,487 B2 * | 11/2013 | Tarte | | G06F 17/5095 700/97 |
| 8,798,807 B2 * | 8/2014 | Mudiam | | G07C 5/085 701/1 |
| 8,963,697 B2 * | 2/2015 | Alliot | | B60K 37/00 340/425.5 |
| 9,122,444 B2 * | 9/2015 | Findlay | | G06F 3/1454 |
| 2002/0015062 A1 | 2/2002 | Shimazu et al. | | |
| 2002/0171541 A1 * | 11/2002 | Crombez | | B60R 16/0232 340/461 |
| 2003/0206194 A1 * | 11/2003 | Boyd | | G06Q 30/0264 715/744 |
| 2004/0162645 A1 * | 8/2004 | Obradovich | | B60G 17/0195 701/1 |
| 2004/0254747 A1 * | 12/2004 | Vollum | | G01L 3/24 702/50 |
| 2005/0134443 A1 * | 6/2005 | Hottebart | | G01D 7/02 340/442 |
| 2005/0151845 A1 * | 7/2005 | Tsukada | | E02F 9/26 348/148 |
| 2007/0006101 A1 * | 1/2007 | Michaels | | B63J 99/00 715/866 |
| 2007/0008186 A1 * | 1/2007 | Michaels | | B63B 49/00 340/945 |
| 2007/0126706 A1 * | 6/2007 | Ziegler | | G06F 3/0418 345/173 |
| 2007/0168101 A1 * | 7/2007 | Shibamori | | E02F 9/26 701/50 |
| 2007/0171087 A1 | 7/2007 | Shimazu et al. | | |
| 2007/0198137 A1 * | 8/2007 | Wille | | B60K 35/00 701/1 |
| 2007/0208469 A1 * | 9/2007 | Wille | | H04L 29/06 701/36 |
| 2008/0059030 A1 * | 3/2008 | Quigley | | A62C 27/00 701/50 |
| 2008/0201108 A1 * | 8/2008 | Furem | | E02F 9/267 702/182 |
| 2008/0221754 A1 * | 9/2008 | Rowe | | A62C 27/00 701/36 |
| 2009/0009308 A1 * | 1/2009 | Date | | B60R 1/00 340/439 |
| 2009/0017986 A1 * | 1/2009 | Oakes | | G06Q 40/00 477/98 |
| 2009/0225067 A1 * | 9/2009 | Yoda | | G09G 3/006 345/211 |
| 2009/0243831 A1 | 10/2009 | Miura et al. | | |
| 2009/0284363 A1 * | 11/2009 | Havins | | B60K 35/00 340/461 |
| 2010/0058743 A1 * | 3/2010 | Tsukada | | F01N 3/0253 60/287 |
| 2010/0070130 A1 * | 3/2010 | Suzuki | | E02F 9/2054 701/33.4 |
| 2010/0321170 A1 * | 12/2010 | Cooper | | G02B 27/01 340/425.5 |
| 2014/0114531 A1 * | 4/2014 | Sugiyama | | G01C 21/3632 701/36 |
| 2014/0152433 A1 * | 6/2014 | Sugiyama | | B60K 35/00 340/438 |

FOREIGN PATENT DOCUMENTS

| | | |
|---|---|---|
| CN | 101550712 A | 10/2009 |
| JP | H09-228883 A | 9/1997 |
| JP | 2002-121776 A | 4/2002 |
| JP | 2002-180862 A | 6/2002 |
| JP | 2005-171527 A | 6/2005 |

OTHER PUBLICATIONS

Office Action dated Mar. 21, 2014 from corresponding Chinese Patent Application No. 201180012815.6, including English translation, 9 pages.

* cited by examiner

| HYBRID DEVICE TEMPERATURE | % | ROTATING MOTOR TEMPERATURE | POWER GENERATOR MOTOR TEMPERATURE | POWER GENERATOR DRIVER TEMPERATURE | ROTATING MOTOR DRIVER TEMPERATURE | CAPACITOR TEMPERATURE | BOOSTER TEMPERATURE |
|---|---|---|---|---|---|---|---|
| A1 | 100 | 200 | 200 | 100 | 100 | 60 | 100 |
| A2 | 90 | 190 | 190 | 95 | 95 | 51 | 95 |
| A3 | 70 | 170 | 170 | 85 | 85 | 33 | 85 |
| A4 | 50 | 100 | 100 | 50 | 50 | 15 | 50 |
| A5 | 20 | -20 | -20 | -20 | -20 | -12 | -20 |
| A6 | 0 | -40 | -40 | -40 | -40 | -30 | -40 |

DISPLAY DEVICE FOR CONSTRUCTION MACHINE

CROSS-REFERENCE TO RELATED APPLICATIONS

This application claims priority to Application No. PCT/JP2011/056002, filed Mar. 15, 2011, which application claims priority to Japanese Application No. 2010-065076, filed on Mar. 19, 2010. The contents of the above applications are incorporated herein by reference in their entireties.

TECHNICAL FIELD

The present invention relates to a display device of a construction machine.

BACKGROUND ART

Conventionally, a construction machine (e.g. a power shovel) is provided with a display device in an operator's room that displays engine cooling water's temperatures, hydraulic oil's temperatures, a fuel amount and the like in an analogue display form of status indicators (e.g. see FIG. 1(a) of Patent Literature 1).

When an abnormality occurs in part of the construction machine, the display device switches one of status indicators to a non-display status, and instead displays a mark to notify of an abnormality.

Thus, display space for the abnormality notification mark does not always need to be provided, so that more status indicators and abnormality notification marks can be displayed without enlarging sizes of the display device. Furthermore, the display device offers a good visibility of each of the status indicators and abnormality notification indicators, as opposed to providing a number of size-reduced indicators.

CITATION LIST

Patent Literature(S)

Patent Literature 1: JP-A-2002-121776

SUMMARY OF THE INVENTION

Problem(s) to be Solved by the Invention

There is a demand for an operator to monitor more measurements such as temperatures and pressures at various parts of a construction machine depending on a type of a construction machine. However, a large number of status indicators cannot be displayed without increasing sizes of the display device or decreasing sizes of status indicators, and a solution therefor has been hoped.

An object of the invention is to provide a display device of a construction machine that is adapted to prevent an increase in the size of the display device and at the same time display more important measurements with a good visibility.

Means for Solving the Problem(s)

A display device for a construction machine according to a first aspect of the invention includes a display controller and displays content based on display signals output from the display controller, and the display controller includes: a value converter that converts a plurality of measurements displayed in a predetermined unit into different values with a same scale; and a value determiner that determines one of the different values converted by the value converter according to a predetermined criterion, and the one of the different values determined by the value determiner is displayed on a display unit.

In the first aspect of the invention, although there are a large number of measurements that need to be monitored, the same display unit can be used by converting each of the measurements into values with the same scale. Since only one display unit is needed for display by determining the one of the different values to be displayed, an increase in a size of the display device can be prevented and a size reduction of the display unit can be avoided, so as to provide good visibility.

In a display device according to a second aspect of the invention, the plurality of the measurements include different display ranges.

In the second aspect of the invention, since the plurality of the measurements include different display ranges, the following advantages can be obtained. When there are the plurality of the measurements of the same type with different display ranges, visibility is significantly worsened when each of the measurements is to be displayed. Specifically, if display ranges differ, a movement area of a needle and the like also differ, so that the movement area of the needle and the like becomes remarkably small for a display range of certain measurements while the movement area of the needle and the like becomes significantly large for a display range of the other measurements, thus deteriorating visibility of the measurements with a small movement area. However, in the second aspect of the invention, the measurements with different display ranges can be displayed by one display unit that has a common display range, so that visibility can reliably be improved.

In a display device according to a third aspect of the invention, the plurality of the measurements belong to a same group in which the measurements are related to one another.

In a display device according to a fourth aspect of the invention, the same group is an electrical group.

When the plurality of the measurements are classified into different groups (e.g. a mechanical group including hydraulic devices and an engine and an electrical group including an electric motor, electric and electronic circuits and components thereof), by converting the plurality of the measurements that belong to the same group into different values of the invention and displaying the different values, a prompt decision can be made, at a time of a display status indicating an abnormality, on whether the abnormality occurs in the mechanical group or in the electrical group, so that maintenance can be swiftly performed. Incidentally, types of the groups can be arbitrarily decided upon operating the display device.

In a display device according to a fifth aspect of the invention, the measurements are temperatures and a cooling water temperature display unit that displays cooling water temperatures of engine cooling water is provided separately from the display unit.

In the fifth aspect of the invention, since the cooling water temperature display unit that displays cooling water temperatures of engine cooling water is provided separately from the display unit so that the cooling water temperatures can be monitored around the clock, an abnormality that occurs in an engine can be promptly detected via the cooling water temperature display unit, so that a large scale of maintenance can be avoided.

In a display device according to a sixth aspect of the invention, the plurality of the measurements are displayed in a same unit.

According to the sixth aspect of the invention, since the plurality of the measurements are displayed in the same unit, the plurality of the measurements can easily be converted into values in a different unit with a common scale, so that data processing programs and the like can be simplified.

In a display device according to a seventh aspect of the invention, the value determiner determines a maximum one of the different values as the one of the different values.

According to the seventh aspect of the invention, since the value determiner determines the maximum value as one of the different values, when, for instance, the measurements are temperatures, an effective response to an overheating (e.g. displaying a value the most likely to exceed an acceptable range of temperatures) can be made.

In a display device according to an eighth aspect of the invention, the value determiner determines any selected one of the different values as the one of the different values.

According to the eighth aspect of the invention, since the value determiner determines any selected one of the different values as the one of the different values, a response to a request for monitoring certain measurements for some reason can be easily made.

Advantages of the Invention

In the above aspects of the invention, due to the members described above being provided, enlargement of a display device can be prevented, and a display device of a construction machine that is adapted to display more important measurements with a good visibility can be provided, so that an object of the invention can be achieved.

DESCRIPTION OF EXEMPLARY EMBODIMENT(S)

An exemplary embodiment of the invention will be described below by reference to drawings.

Figure 1:
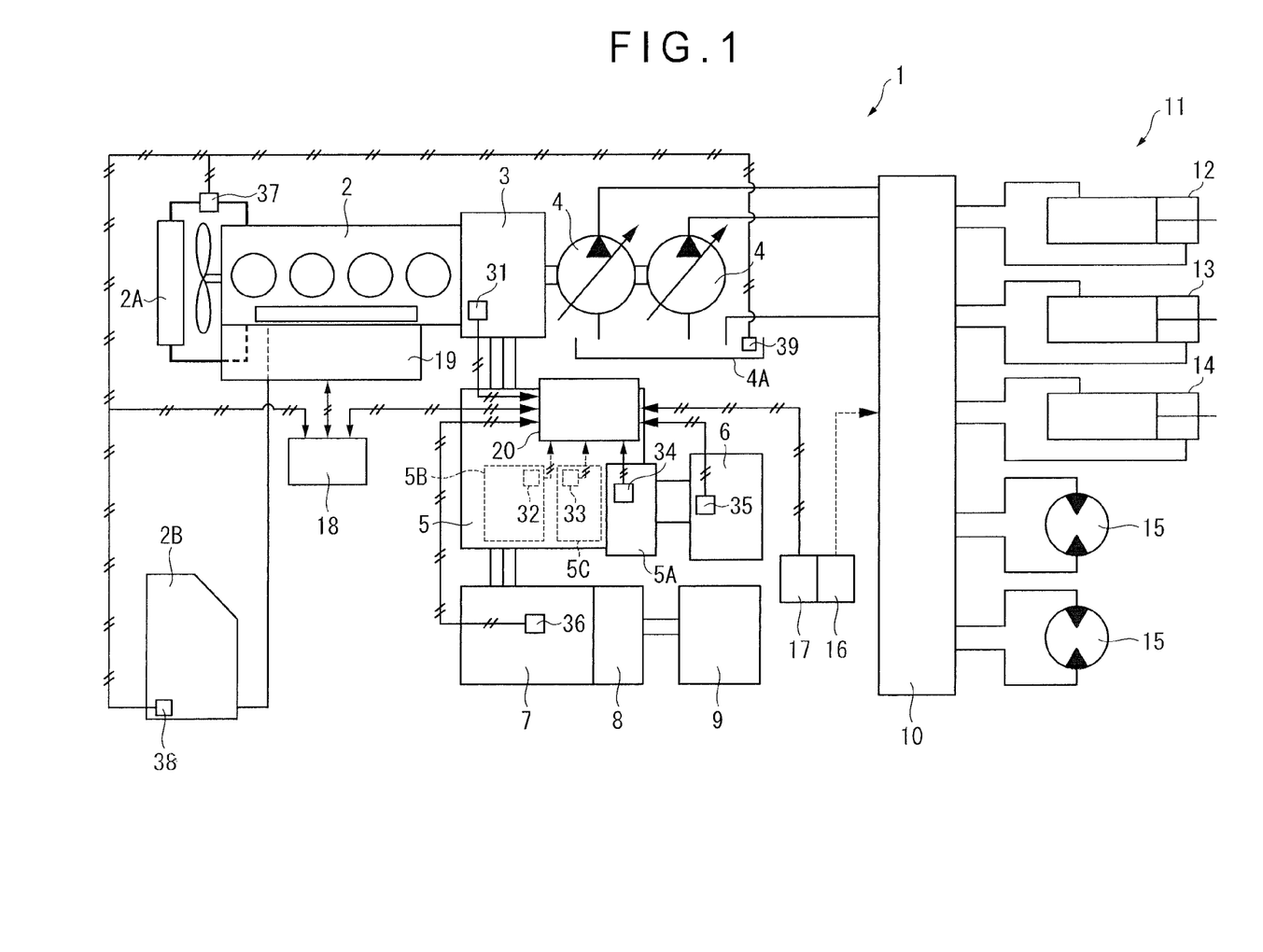
FIG. 1 is a block diagram showing a system configuration of a construction machine installed with a display device according to an exemplary embodiment of the invention.

In FIG. 1, a power shovel 1 (a construction machine) is provided with an engine 2 (driving source). A power generator motor 3 and a pair of hydraulic pumps 4,4 are coupled in series to one another via an output shaft of the engine 2 and are driven by the engine 2.

Electric power generated by the power generator motor 3 is charged into a capacitor 6 via an inverter 5. The electric power charged into the capacitor 6 is boosted by a booster 5A and is output to a rotating electric motor 7 via the inverter 5. The rotating electric motor 7 drives an upper revolving body 9 via a reducer 8 having an epicyclic gear unit or the like.

On the other hand, hydraulic oil pumped by the hydraulic pump 4 is supplied to a work equipment 11 via the control valve 10. The work equipment 11 of the power shovel 1 includes a boom, an arm and a bucket (not shown), where hydraulic oil flows in and out from a boom cylinder 12, an arm cylinder 13 and a bucket cylinder 14 provided to the boom, arm and bucket, respectively, so that the work equipment 11 is hydraulically driven.

A vehicle body of the power shovel 1 is provided with a pair of crawler-type lower traveling bodies (not shown), in addition to the upper revolving body 9 installed in a rotatable manner The lower traveling bodies include traveling hydraulic motors 15 to drive a sprocket that is engaged with a crawler. Hydraulic oil from the hydraulic pump 4 is also supplied to the traveling hydraulic motors 15 via the control valve 10.

Accordingly, the power shovel 1 according to this exemplary embodiment is a hybrid construction machine that rotates the upper rotating body 9 by electric energy and drives the work equipment 11 and the lower traveling bodies by hydraulic pressure. Incidentally, each of the above components other than the traveling hydraulic motor 15 is installed in the upper revolving body 9 and rotates along with the upper revolving body 9.

In the power shovel 1, the power generator motor 3, a power generator driver 5B (e.g. IGBT) provided in the inverter 5, a rotating motor driver 5C, the booster 5A, the capacitor 6, the rotating electric motor 7 and the like are treated as hybrid devices, and a rise in temperature due to heat generation needs to be monitored. Hence, each of the above hybrid devices is provided with temperature measuring units 31 to 36 (e.g. temperature sensor) that each output measurement signals to the rotation control device 20.

In this exemplary embodiment, temperatures measured by a number of the temperature measuring units provided in the construction machine are classified into a mechanical group including the work equipment 11, the lower traveling bodies and the engine 2 and an electric group including the power generator motor 3, the rotating electric motor 7, electric and electronic circuits and components thereof Temperatures of the hybrid devices fall into the electric group. Incidentally, the hybrid devices are cooled using a cooling water circuit (not shown) separate from an engine cooling water circuit.

Furthermore, the upper revolving body 9 of the power shovel 1 is provided with a cab where an operator operates the power shovel 1. The cab houses an operator seat, a fuel dial to set a fuel amount supplied to the engine 2, levers, pedals, other switches, a display device and the like. In FIG. 1, a work equipment lever 16 for operating the work equipment 11, a rotating lever 17 for rotary operation and a display device 18 installed in the cab are illustrated, representing all the above units.

The levers and pedals above include left and right operational levers adapted to be operated in anterior, posterior, left and right directions that are provided on both left and right sides of a front part of the cab. The left operational lever is used for rotating the work equipment 11 and operating an arm. The left operational lever is illustrated as the rotation lever 17 in FIG. 1. The right operational lever is used to operate the boom and bucket and is also illustrated in FIG. 1 as the work equipment lever 16. In addition, a pair of operational levers for traveling are provided in the middle of a front part of the cab, and a pair of pedals that are operated in conjunction with the operations of the levers are provided under the operational levers.

The work equipment lever 16 includes a PPC valve. The control valve 10 is opened and closed by pilot pressure generated by the PPC valve to move the boom and bucket of the work equipment 11.

The rotation lever 17 also includes a PPC valve and opens and closes the control valve 10 by the pilot pressure from the PPC valve to operate the arm. A hydraulic channel from the PPC valve is attached with a pressure sensor. Pressures varying according to an angle at which the rotation lever 17 is tilted is converted into electric lever signals by the pressure sensor to output electric lever signals to the rotation control device 20. Incidentally, the rotation lever 17 may include a potentiometer and the like to generate the lever signals according to the tilted angle and output the lever signals to the rotation control device 20.

The display device 18 includes a display panel 67 (e.g. liquid crystal panel), a display driver (not shown) to drive the display panel 67 and a display controller 68 discussed later. The display device 18 is electrically connected to the engine controller 19 and the rotation control device 20 so as to display information output by the engine controller 19 and the rotation control device 20 and output a predetermined signal to the engine controller 19 and the rotation control device 20. In particular, the rotation control device 20 outputs temperature information of the above-mentioned hybrid devices.

Measurement signals for cooling water temperatures are output to the display device 18 from a temperature measuring unit 37 provided to a cooling water circuit between the engine 2 and a radiator 2A. Measurement signals for a fuel amount are output to the display device 18 from a fuel measuring unit 38 provided to a fuel tank 2B. Measurement signals for hydraulic oil temperatures are also output to the display device 18 from a temperature measuring unit 39 provided to a hydraulic oil tank 4A. In this exemplary embodiment, unlike the above-mentioned electric group including the hybrid devices, each of the above temperatures falls into the mechanical group.

Figure 2:
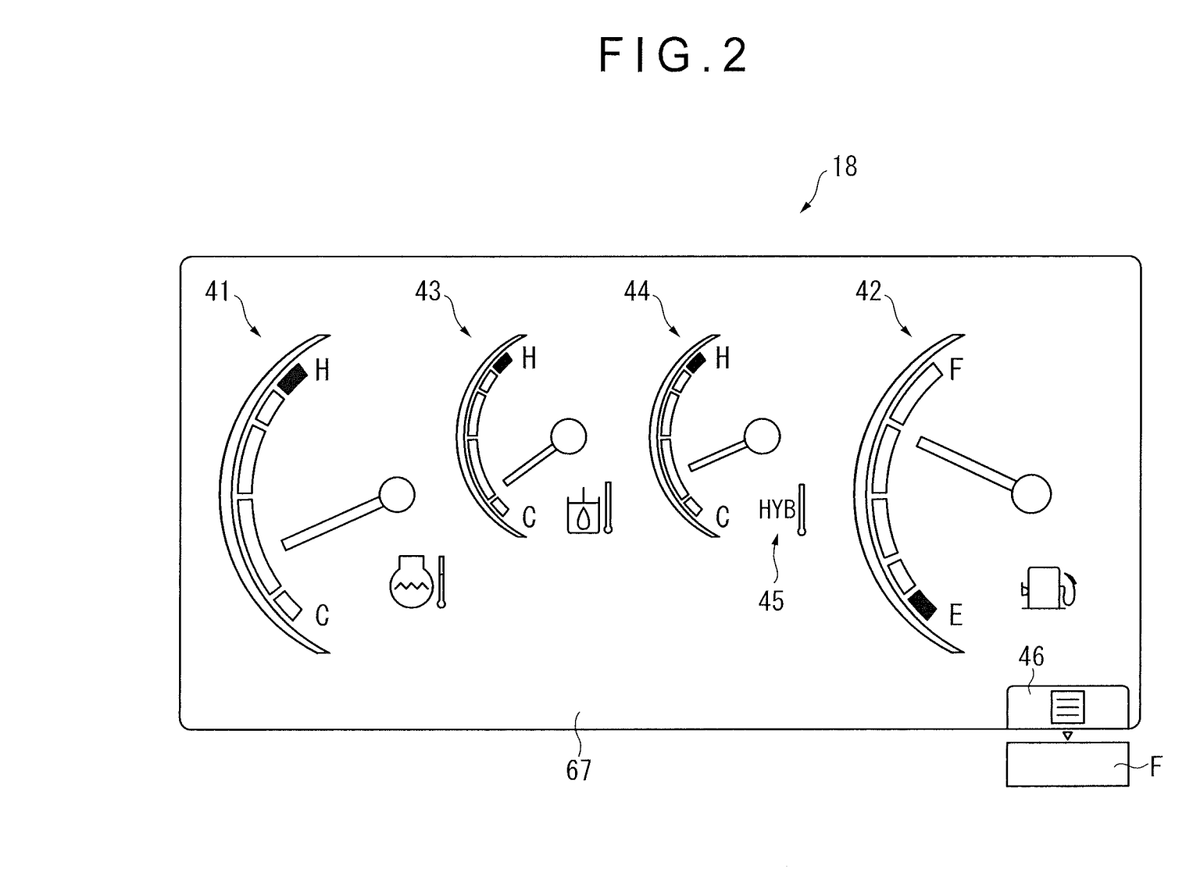
FIG. 2 is a drawing showing a display content of the display device.

FIG. 2 shows display content of the display device 18. On a screen of the display panel 67 of the display device 18, a cooling-water temperature indicator 41 and a fuel amount indicator 42 are displayed in a large-size analogue display form at left and right positions spaced away from one another. A hydraulic oil temperature indicator 43 and a hybrid device temperature indicator 44 are displayed in a smaller-size analogue display form between the cooling-water temperature indicator 41 and the fuel amount indicator 42. The display device 18 also displays a fuel amount and various types of temperatures and can further display information indicating operating time (e.g. hour meter) on the same screen.

Figure 3:
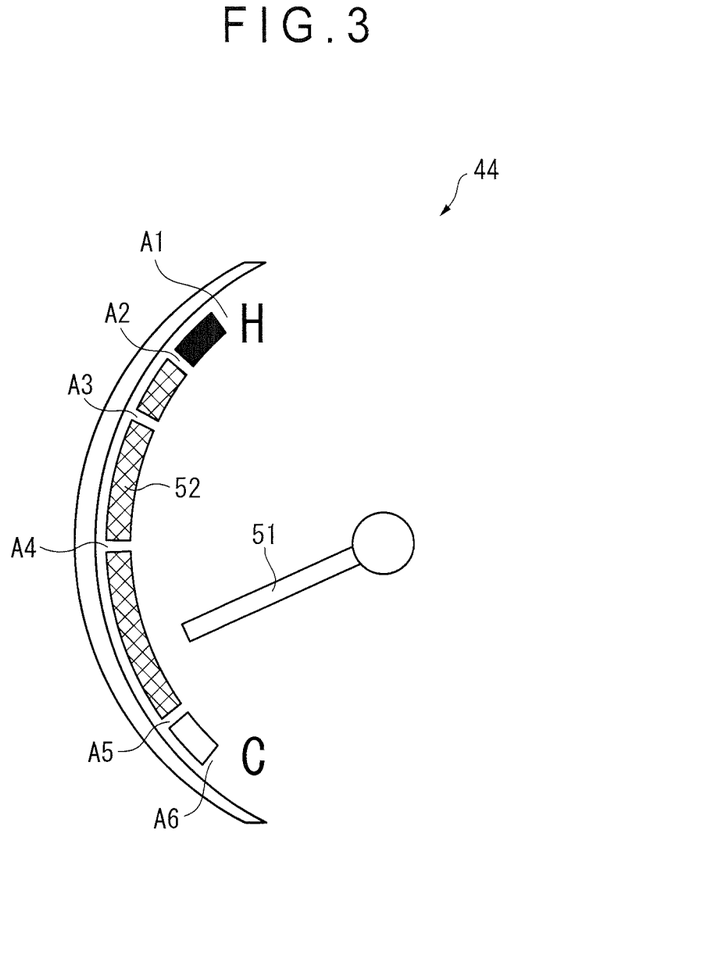
FIG. 3 is an expanded view of a status indicator of the display device.

The hybrid device temperature indicator 44 (display unit of the invention) will be described in detail by reference to expanded views of FIG. 2 and FIG. 3.

A belt-shaped gauge display 52 is displayed at a position opposed to an end of a needle mark 51 displayed in a shape of a needle. The gauge display 52 is divided into five sections. Dividing parts and upper and lower ends thereof are referred to as scales A1 to A6 from the upper end to the lower end. The gauge display 52 between the scales A1 and A2 is red, and the gauge display 52 between the scales A2 and A5 is green. The gauge display 52 between the scales A5 and A6 is white. The green part is indicated as a shaded area in FIG. 3.

In the hybrid device temperature indicator 44, the scales A1, A2, A3, A4, A5 and A6 denote "100%," "90%," "70%," "50%," "20%" and "0%," respectively. In other words, the hybrid device temperature indicator 44 displays temperatures in percentage as gauge values (hereinafter referred to as percentage display or % display in some cases).

The hybrid devices displayed in percentage include, for instance, the power generator motor 3, the power generator driver 5B, the rotating motor driver 5C, the booster 5A, the capacitor 6 and the rotating electric motor 7. In each of the hybrid devices, an acceptable temperature range is set as shown in a temperature table T of FIG. 4. A maximum acceptable temperature is set at "100%" and is displayed as the scale A1. A minimum acceptable temperature is set at "0%" and is displayed as the scale A6. Other scales A2 to A5 and temperatures (unit:° C.) corresponding to each of the percentages are set in the temperature table T.

Figure 4:
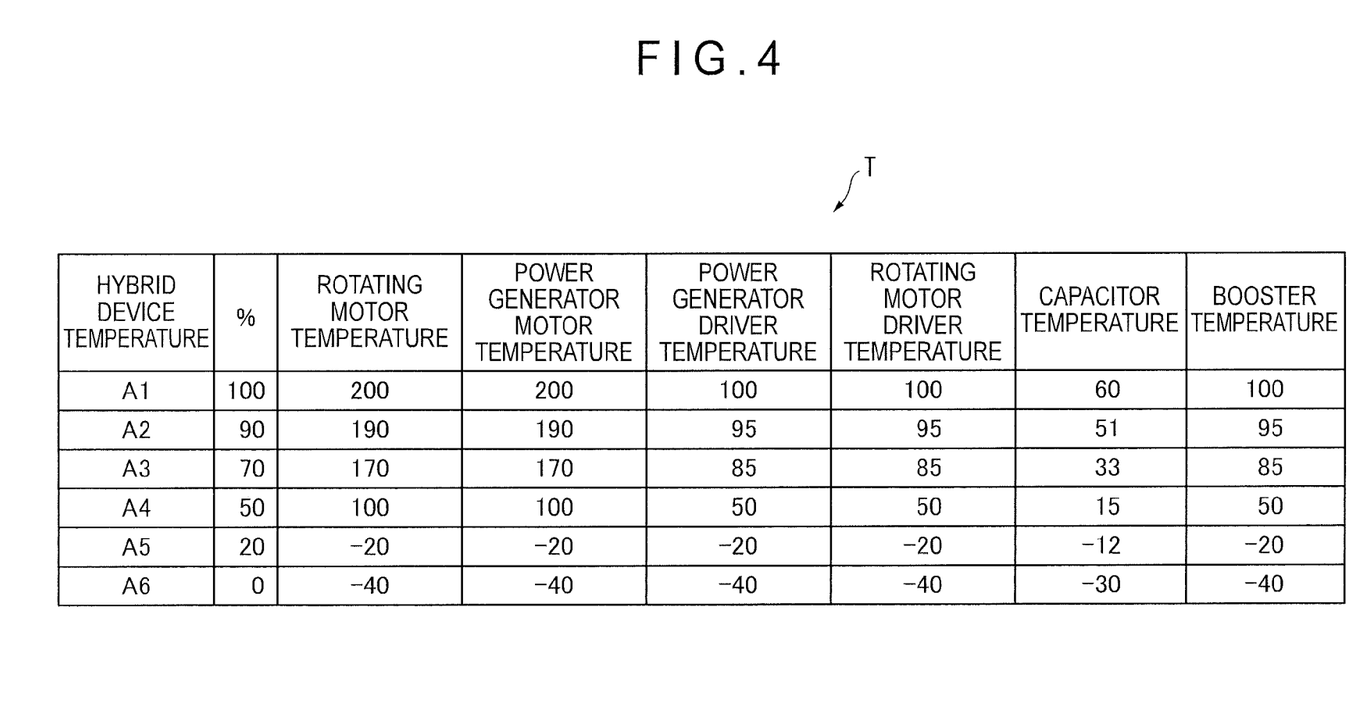
FIG. 4 illustrates temperature setting corresponding to each scale of the status indicators.

Specifically, since the temperatures shown in FIG. 4 are ranging over a plurality of different display ranges (i.e. temperature ranges), the temperatures would conventionally be displayed in indicators having respective display ranges. However, the hybrid device temperature indicator 44 according to the exemplary embodiment displays what percent of the maximum acceptable temperature (predetermined reference value) the temperatures of the hybrid devices comes at. Specifically, temperatures of a rotating motor, the power generator motor, the power generator driver, the rotating motor driver, the capacitor and the booster that are adapted for each of the hybrid devices are displayed. Practically, however, the highest percentage logged by among the above hybrid devices is determined and displayed.

At this point, when the needle mark 51 is between the scales A1 and A2 and points to a red area of the gauge display 52, a hybrid device temperature mark 45 (see FIG. 2) that is displayed in the vicinity of the hybrid device temperature indicator 44 is switched in display color from white to red to notify an operator of an occurrence of an overheating. When an actual temperature of the hybrid devices exceeds the maximum acceptable temperature, an alarm buzzer (not shown) goes off.

Thus, according to the exemplary embodiment of the invention, although there are multiple hybrid devices with different temperature ranges that need to be monitored for a rise in temperature, the hybrid device temperature indicator 44 and the scales A1 to A6 can be used as a common indicator and scales for displaying temperatures of each of the hybrid devices by converting each of the temperatures into percentage (i.e. a common measurement unit). Furthermore, since an operator needs to monitor only temperatures of one of the devices that is the most likely to be overheated, the hybrid device temperature indicator 44 also needs to display only one temperature.

In the display device 18, a function key F that functions in tandem with a detailed information mark 46 displayed at a lower-right of the screen is provided. When the function key F is pressed while the hybrid device temperature mark 45 is lamped in red, a screen of the display device 18 is switched to one displaying names, marks and the like of an overheated hybrid device, and the overheated hybrid device is identified by an operator or a serviceman.

The rotation control device 20 controls rotation of the upper revolving body 9 and temperature display for the hybrid devices, and includes various types of hardware and software used in computer technologies. The rotation control device 20 according to the exemplary embodiment of the invention is installed in the inverter 5 and is also electrically connected to the inverter 5.

Figure 5:
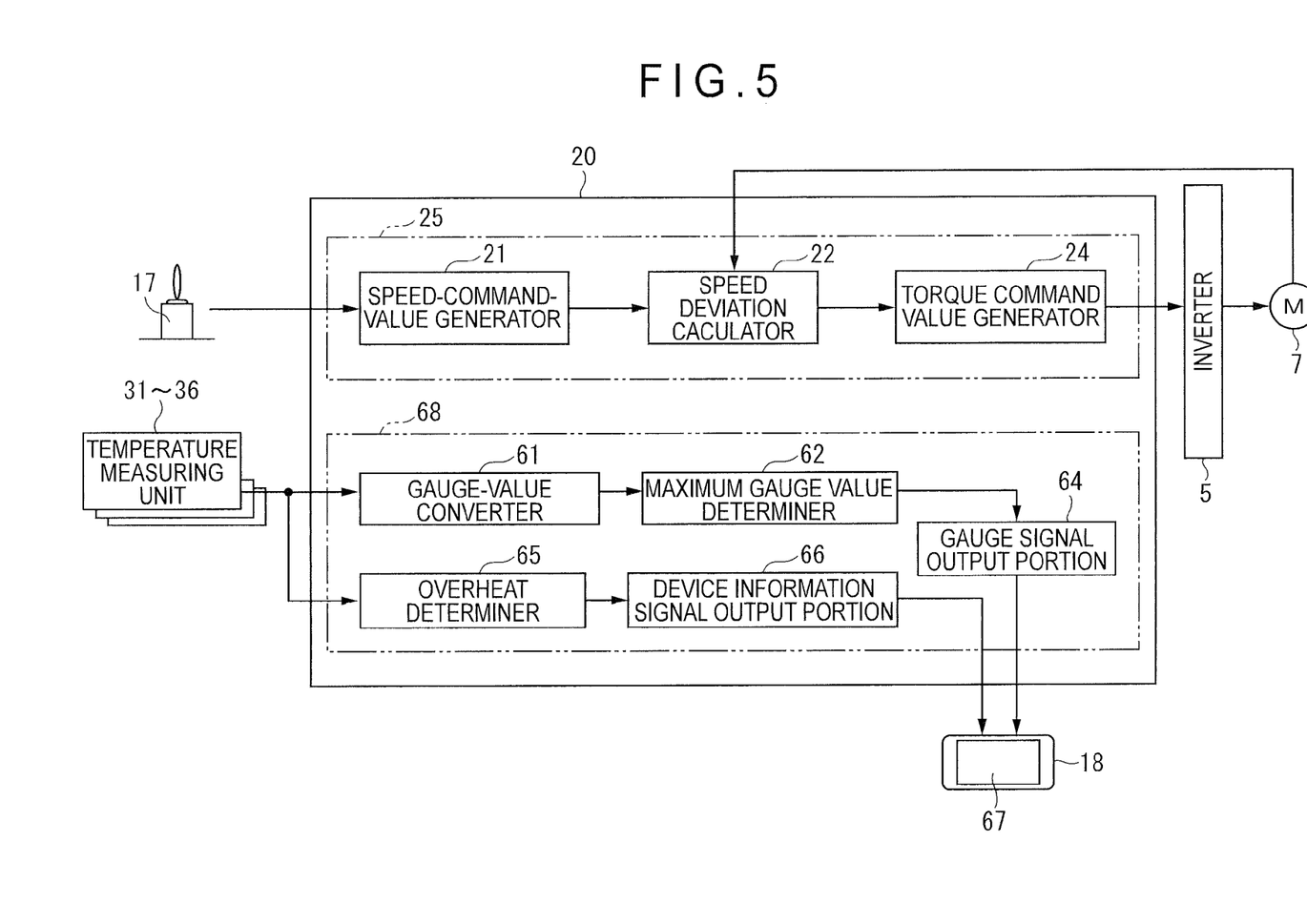
FIG. 5 is a block diagram showing a rotation control device installed in the construction machine.

The rotation control device 20 will be detailed below by referencing FIG. 5. In FIG. 5, the rotation control device 20 includes a speed-command-value generator 21, a speed deviation calculator 22 and a torque command value generator 24 that are constructed as part of computer programs. The speed-command-value generator 21, the speed deviation calculator 22 and the torque command value generator 24 constitute a rotation controller 25.

When the rotation lever 17 is operated, the speed-command-value generator 21 generates and outputs a speed command value based on lever signals output according to an angle at which the rotation lever 17 is tilted.

The speed deviation calculator 22 is a unit to control speed feedback of the upper revolving body 9 and calculates and outputs a deviation between an actual speed of the rotating electric motor 7 and a speed command value generated by the speed-command-value generator 21.

The torque command value generator 24 generates a torque command value by multiplying the deviation output by the speed deviation calculator 22 by a predetermined gain and outputs the torque command value to the inverter 5.

Subsequently, the inverter 5 converts the torque command value into an electric current value to drive the rotating electric motor 7.

In addition, the rotation control device 20 according to the exemplary embodiment includes a gauge-value converter 61, a maximum gauge value determiner 62, a gauge signal output portion 64, an overheat determiner 65, a device information signal output portion 66 and a memory portion (not shown) that are also constructed as part of computer programs. The above components 61 to 66 constitute the display controller 68 of the display device 18.

The gauge-value converter 61 (value converter according to the invention) obtains measurement signals from the temperature measuring units 31 to 36 provided to the hybrid devices and calculates gauge values (unit: %) that indicates what percent of the maximum acceptable temperature each of actual measured temperatures comes to. At this point, a gauge value is calculated based on the temperature table T shown in FIG. 4 that is stored at a storage unit. The gauge-value converter 61 also performs an interpolation calculation to interpolate gauge values between the scales A1 to A6 that are used for a needle display over a full swath of the scales A1 to A6.

The maximum gauge value determiner 62 (value determiner of the invention) determines a maximum gauge value out of gauge values for each of the hybrid devices that are calculated by the gauge-value converter 61.

The gauge signal output portion 64 outputs gauge signals to a display driver of the display device 18.

The overheat determiner 65 determines if a gauge value of the hybrid devices is 90 percent or more. Ninety percent or more of the gauge value indicates that the needle mark 51 starts pointing to a red area of the hybrid device temperature indicator 44, a situation in which an overheating takes place.

When the overheat determiner 65 determines that the gauge value is 90% or more, the device information signal output portion 66 generates signals that switch a color of display of the hybrid device temperature mark 45 from white to red, generates information on names of devices to be displayed by operating the function key F and outputs signals for the information (device information signals) to a display driver of the display device 18.

On the other hand, the display driver of the display device 18 that obtains the gauge signals from the gauge signal output portion 64 and the device information signals from the device information signal output portion 66 makes the needle mark 51 point to the scale A1 while displaying the hybrid device temperature mark 45 in red and also readying display of device information such as names of devices in preparation for the function key F being pressed.

Information displayed by operating the function key F may include a name of a hybrid device with the maximum gauge value displayed in a normal status, in addition to the name of the overheated device. In other words, the name of the device may be identified by the device information signal output portion 66 based on the result decided by the maximum gauge value determiner 62 to be output to the display driver of the display device 18 as the device information signal.

In the above configuration, gauge signals input into the display driver of the display device 18 preferably pass through a filter, and the filter is further preferably provided between the maximum gauge value determiner 62 and the gauge signal output portion 64. The filter blocks noise components (signals in a predetermined frequency range) of the gauge signals for the gauge values. The filter prevents an instantaneous movement of a needle when displayed information is switched.

For instance, when the gauge value display for the hybrid devices that is indicated by the needle mark 51 is switched from a state showing high gauge values to another state showing low gauge values, the output of gauge signals to the display driver is delayed by providing the filter due to a passage of the gauge signals through the filter. Thus, the needle mark 51 can be displayed to go down consecutively as though the needle mark 51 is rotated instead of instantaneously switching a display position of the needle mark 51 from a high display position to a low display position, so that movements of a mechanical needle can be simulated.

When the filter is not provided and a hybrid device to be displayed is selected by a selection switch and the like to switch to display of a gauge value of the hybrid device, an operator who switches the display may not be aware of the switching because the display is instantly switched upon operating the switch. Particularly when there is a small gap in gauge values between before and after the switching, concerns remains of whether the display is properly switched to a gauge value of the desired hybrid device because an operator cannot recognize the instantaneous switching. In a good contrast to the above, when the filter is provided, the passage of the gauge signals through the filter delays the output of the gauge signals to the display driver, spacing a brief moment between the switching operation and a completion of the switching, so that even the instant switching with a small gap in gauge values can be reliably confirmed.

A processing flow of status display of the display controller 68 will be described below based on a block diagram of FIG. 5 and a flowchart of FIG. 6.

Figure 6:
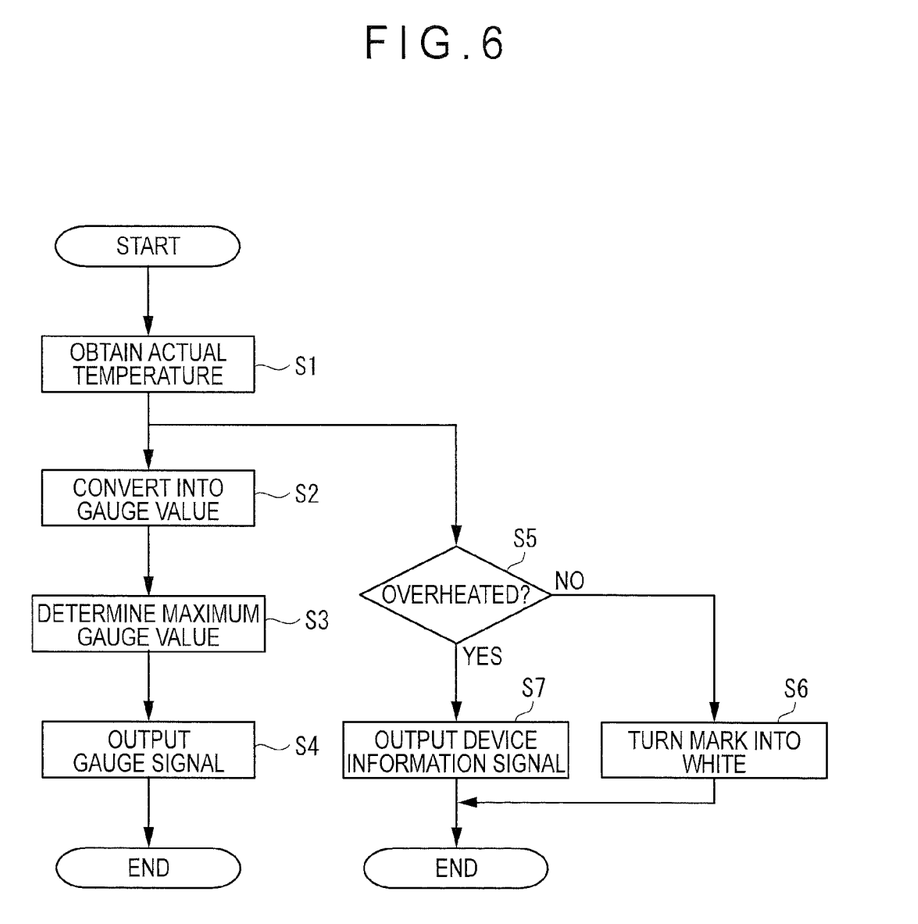
FIG. 6 is a flowchart showing a processing flow of status display at a display controller.

In FIG. 6, first, the gauge-value converter 61 of the display controller 68 obtains measurement signals from the temperature measuring units 31 to 36 (S1), calculates what percent of the maximum acceptable temperatures for each of the hybrid devices actual measured temperatures come at and converts the actual measured temperatures into gauge values (S2). Secondly, the maximum gauge value determiner 62 determines maximum one of gauge values for each of the hybrid devices and outputs gauge signals for the maximum gauge value to the gauge signal output portion 64 (S3). Then, the gauge signal output portion 64 outputs the gauge signals for the maximum gauge value to the display driver of the display device 18 (S4).

On the other hand, after the measurement signals are obtained from temperature measuring units 31 to 36 in 51, and the overheat determiner 65 determines on an overheated status of the hybrid devices (S5). When none of the hybrid devices are overheated, "NO" is taken and the device information signal output portion 66 outputs a signal that turns the hybrid device temperature mark 45 into white (S6) to the display driver of the display device 18.

On the other hand, when it is determined in S5 that an overheating occurs, "YES" is taken and the device information signal output portion 66 turns the hybrid device temperature mark 45 into red and generates device information signals (e g names of the devices) to output the device information signals to the display driver of the display device 18 (S7). The gauge signal output portion 64 outputs gauge signals for an overheated status in S4 to the display driver of the display device 18.

In the above exemplary embodiment, since actual measured temperatures are converted into gauge values that represent percentage of the maximum acceptable temperatures and a hybrid device with the largest percentage is displayed to monitor temperatures of a large number of hybrid devices, only one hybrid device temperature indicator 44 and the needle mark 51 that points to the hybrid device temperature indicator 44 are required to be displayed, irrespective of any one of the hybrid devices being monitored. Accordingly, since the hybrid device temperature indicator 44 and the needle mark 51 do not need to be displayed for each of the hybrid devices, an increase in a size of the display device 18 can be prevented while sizes of the hybrid device temperature indicator 44 and the needle mark 51 are not reduced, so as to provide a good visibility.

Incidentally, the scope of the invention is not limited to the above exemplary embodiment but includes modifications and improvements to the extent that an object of the invention can be achieved.

In the exemplary embodiment, the hybrid device temperature indicator 44 that displays gauge values in percentage includes the needle mark 51 and the gauge display 52. However, the hybrid device temperature indicator 44 may be configured to display a mark and name of a hybrid device together (simultaneously) to identify the hybrid device currently displayed, in addition to the needle mark 51 and the gauge display 52.

Figure 7:
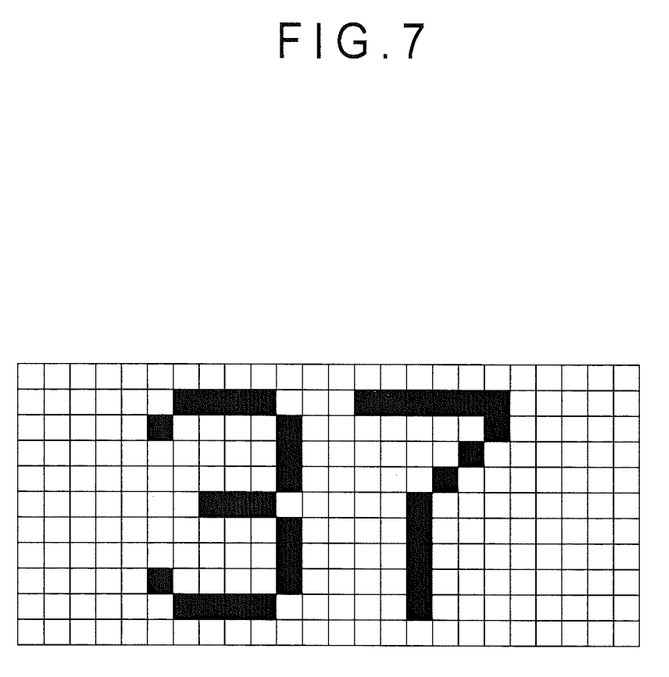
FIG. 7 illustrates a modification of the invention.
Figure 8:
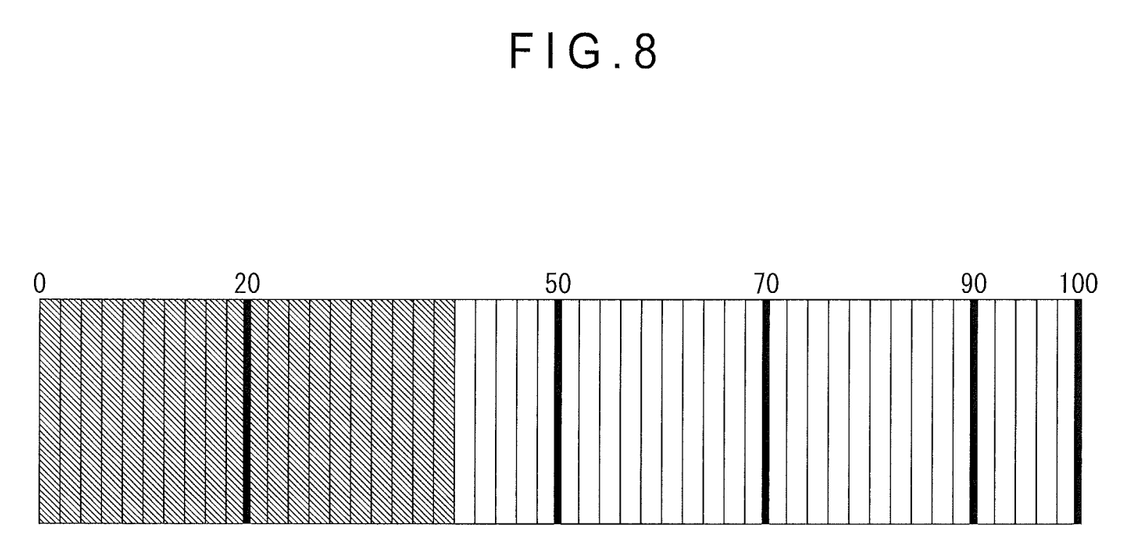
FIG. 8 illustrates another modification of the invention.
Figure 9:
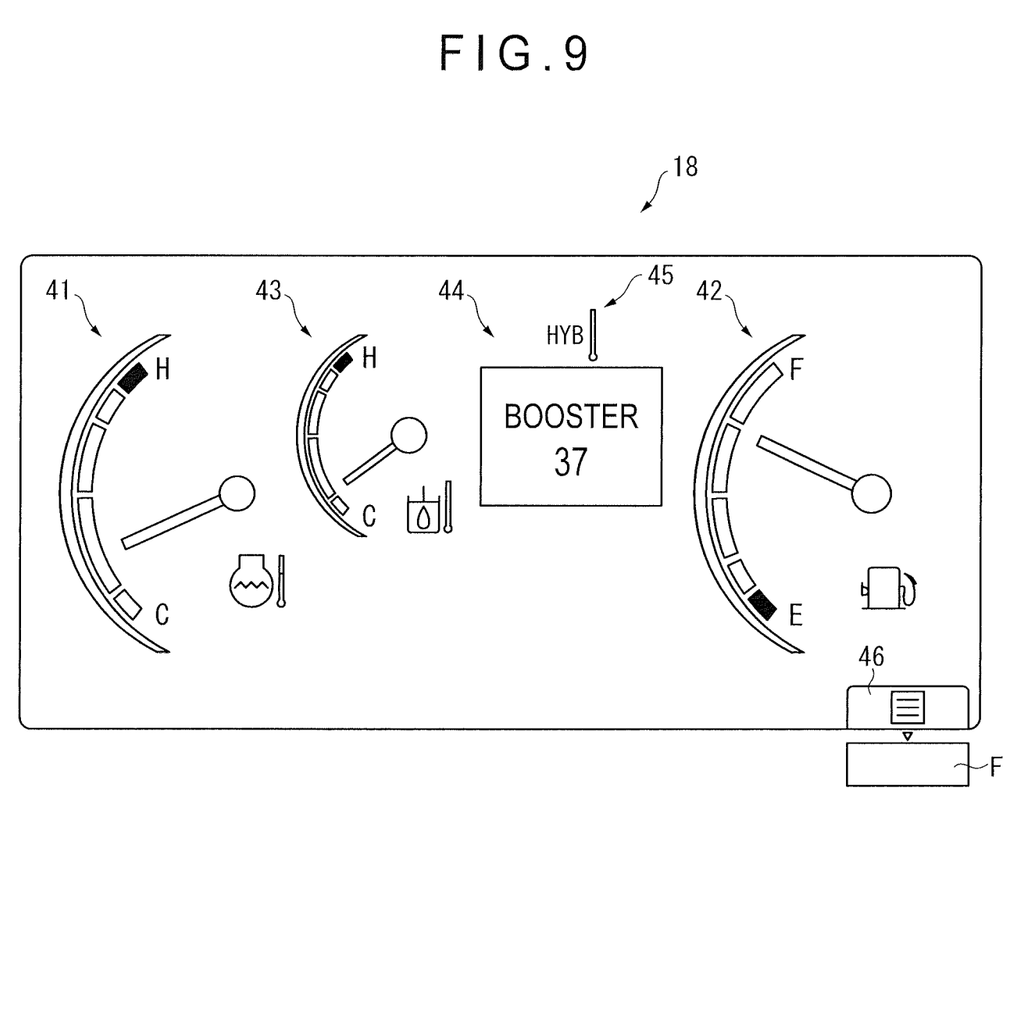
FIG. 9 illustrates a further modification of the invention.

In the exemplary embodiment, gauge values are displayed in an analogue display form by the hybrid device temperature indicator 44 and the needle mark 51. However, the gauge values may be displayed in another display unit. For instance, as shown in FIG. 7, a proportion of the gauge values to the maximum acceptable temperatures can be numerically displayed in a digital display form by a large number of segments arranged in a dotted matrix (e.g. equivalent of pixels on a liquid crystal panel). Alternatively, as shown in FIG. 8, the proportion can also be displayed in a bar display form that includes a large number of vertically long segments arranged horizontally. In display forms shown in FIGS. 7 and 8, the mark and name of a hybrid device may be displayed together. FIG. 9 illustrates an example displaying a name of a hybrid device in addition to a numerical display in a digital display form.

When displayed in an analogue display form, instead of using a liquid crystal panel and the like, an indicator similar to the hybrid device temperature indicator 44 may be provided on a base plate and a mechanical needle that rotates corresponding to gauge value may also be provided. The needle can be rotated on the base plate with the needle rotating around a rotating shaft.

In the exemplary embodiment, even when an actual measured temperature exceeds the maximum acceptable temperature, the needle mark 51 does not go further than the scale A1 that denotes 100%. However, positions to some extent above the scale A1 can be displayed by the needle mark 51, so that an operator can view and confirm an occurrence of an overheating.

In the exemplary embodiment, temperatures are used as an example of measurements to describe the invention. However, a fluid amount and the like are also acceptable as the measurements, and the fluid amount includes an air flow amount, a hydraulic oil amount and a fuel amount. When an exhaust-after-treatment device including urea denitration catalyst is adopted, a urea-water amount (reduction agent) may be alternatively used. Further, measurements related to pressures such as battery voltage, air pressure of a tire and hydraulic oil pressure are also acceptable. Moreover, when the measurements are converted into gauge values (e.g. percentage), values of the measurements with various units may also be converted into percentage and displayed in one indicator.

In the exemplary embodiment, the maximum gauge value determiner 62 that determines the largest one of gauge values is provided. However, a value determiner that determines a minimum one of gauge values may be provided depending on a type of a measurement. Decisions on what gauge value to be used may be made when using the display device.

In the exemplary embodiment, by providing the maximum gauge value determiner 62 (value determiner of the invention), the largest one of gauge values is displayed on the hybrid device temperature indicator 44 under normal conditions in which an overheating does not take place.

However, the value determiner of the invention is not limited to the above configuration. For instance, each of items in the temperature table T of FIG. 4 including "rotating motor temperature," "power generator motor temperature" and "power generator driver temperature" may be configured to be able to be displayed on the display device 18. Then, any one of the items in the temperature table T can be selected to display the gauge value of the selected item by a selection unit such as a selection switch and touch-panel functions provided to the display device 18.

In other words, "a value according to a predetermined criterion" also includes a given value selected by a decision by an operator or a serviceman, along with a value determined in relative comparison with more than one gauge value.

In the exemplary embodiment, the display controller 68 of the invention is housed by the rotation control device 20. However, the device controller 68 may be integrated into the display panel 67 of the display device 18, as in a case with the display driver. As an essential point, the display device 18 is only required to be able to display information output from the display controller 68 that is part of the display device 18.

The invention claimed is:

1. A display device for a construction machine comprising:
   a display unit that is configured to display one measurement value at a time; and
   a display controller, wherein the display device is configured to display content based on display signals output from the display controller, the display controller comprising:

a value converter that converts a plurality of measurements corresponding to different display ranges of a predetermined unit into different values sharing a common scale such that the plurality of measurements are representable as a percentage of the corresponding predetermined maximum acceptable amount of each of the plurality of measurements, and a value determiner that determines a single converted value, among the different values converted by the value converter, to be displayed on the display unit based on priority, wherein the determined single converted value is displayed on the display unit such that the plurality of measurements corresponding to different display ranges are displayed one at a time on the display unit based on the different values sharing the common scale, wherein the other of the different values that are not displayed on the display unit are not displayed on the display device.

2. The display device for a construction machine according to claim 1,
wherein the plurality of the measurements belong to a same group in which the measurements are related to one another.

3. The display device for a construction machine according to claim 2,
wherein the same group is an electrical group.

4. The display device for a construction machine according to claim 1,
wherein the measurements are temperatures and
a cooling water temperature display unit that displays cooling water temperatures of engine cooling water is provided separately from the display unit.

5. The display device for a construction machine according to claim 1,
wherein the plurality of the measurements are displayed in a same unit.

6. The display device for a construction machine according to claim 1,
wherein the value determiner determines, based on the priority, a maximum value from the converted values to be the single converted value that is displayed on the display unit.

7. The display device for a construction machine according to claim 1,
wherein the value determiner determines, based on the priority, a minimum value from the converted values to be the single converted value that is displayed on the display unit.

8. A display device, comprising:
a display panel having a display unit, the display unit being configured to display one measurement value at a time; and
a display controller configured to output display signals to the display panel, the display controller comprising:
a value converter that converts (i) a first measurement value associated with a first measurement range into a first scaled value that represents the first measurement value as a percentage of a maximum acceptable amount of the first measurement value and (ii) a second measurement value associated with a second different measurement range different from the first measurement range into a second scaled value that represents the second measurement value as a percentage of a maximum acceptable amount of the second measurement value, wherein the first and second scaled values are associated with a common display range, and
a value determiner that selects a single one of the first and second scaled values based on priority, wherein the selected single value is displayed on the display unit based on the first and second scaled values sharing the common display range, and wherein the other of the first and second scaled values that is not displayed on the display unit is not displayed on the display panel.

9. The display device according to claim 8,
wherein the value determiner selects a maximum value from the scaled values to be the single value that is displayed on the display unit.

10. The display device according to claim 8,
wherein the value determiner selects a minimum value from the scaled values to be the single value that is displayed on the display unit.

11. The display device according to claim 8,
wherein the measurement values are associated with temperature measurements, and
wherein the display panel includes an additional display unit for displaying cooling water temperatures of engine cooling water.

12. The display device for a construction machine according to claim 1, wherein the display unit includes an indicator that is configured to indicate a percentage display, the indicator being configured to display any one of the different values converted by the value converter, and wherein the display controller is configured to cause the indicator to indicate only the determined single value.

13. The display device according to claim 8, wherein the display unit includes an indicator that is configured to indicate a percentage display, the indicator being configured to display any one of the different values converted by the value converter, and wherein the display controller is configured to cause the indicator to indicate only the determined single value.

* * * * *